United States Patent [19]

Yomogida et al.

[11] Patent Number: 4,985,886
[45] Date of Patent: Jan. 15, 1991

[54] TRANSMISSION LINE BRANCHING DEVICE

[75] Inventors: Toshihiko Yomogida; Akira Uchida, both of Kariya; Goro Kobayashi, Okazaki; Hisanori Nakamura, Toyota, all of Japan

[73] Assignees: Toyoda Koki Kabushiki Kaisha, Kariya; Toyota Jidosha Kabushiki Kaisha, Toyota, both of Japan

[21] Appl. No.: 420,378

[22] Filed: Oct. 12, 1989

[30] Foreign Application Priority Data

Nov. 25, 1988 [JP] Japan .................. 63-298946

[51] Int. Cl.5 .......................................... H04B 10/02
[52] U.S. Cl. .......................................... 370/1; 370/24
[58] Field of Search ............... 370/1, 4, 24, 26, 29, 370/32; 455/601, 606, 607

[56] References Cited

U.S. PATENT DOCUMENTS

| 4,288,869 | 9/1981 | Kolodzey et al. ............... 370/4 |
| 4,641,373 | 2/1987 | Shutterly ............... 455/601 |
| 4,641,378 | 2/1987 | McConnell et al. ............... 455/618 |
| 4,742,572 | 5/1988 | Yokoyama ............... 455/601 |
| 4,747,094 | 5/1988 | Sakaguchi et al. ............... 455/601 |
| 4,881,220 | 11/1989 | Yomogida et al. ............... 370/13 |

FOREIGN PATENT DOCUMENTS

| 59-72254 | 4/1984 | Japan . |
| 59-72255 | 4/1984 | Japan . |
| 60-130 | 1/1985 | Japan . |
| 60-12834 | 1/1985 | Japan . |
| 60-76830 | 5/1985 | Japan . |
| 60-248037 | 12/1985 | Japan . |
| 61-107248 | 7/1986 | Japan . |
| 63-54032 | 3/1988 | Japan . |
| 63-236137 | 10/1988 | Japan . |

Primary Examiner—Douglas W. Olms
Assistant Examiner—Melvin Marcelo
Attorney, Agent, or Firm—Oblon, Spivak, McClelland, Maier & Neustadt

[57] ABSTRACT

A branching device to send out data received at an arbitrary one of three terminals thereof through the other two terminals. In the device, the terminals are coupled to each other by means of photo-couplers. The head of a data block received by each receiver connected with each terminal is detected, and after such detection of the head, a signal which specifies the length of the data block is generated. Thus, after communication data are received by way of an arbitrary one of the terminals, reception of communication data by way of the other two terminals is inhibited while transmission of the communication data is enabled in response to the signal specifying the data block detected.

Since the transmission lines of the three directions are electrically isolated from each other by the photo-couplers, even when a failure of short-circuiting occurs at a main transmission line or a branch line or the like, communications are continued bypassing the location of the failure similarly as in the case of a failure of breaking of a wire.

8 Claims, 8 Drawing Sheets

TRANSMISSION LINE BRANCHING DEVICE

BACKGROUND OF THE INVENTION

This invention relates to a branching device interposed in a half duplex transmission line. More specifically, the present invention relates to a branching device which is used to connect branch lines of communication module appliances disposed at individual machining stations to a main transmission line.

Conventionally, a communication system is known wherein sequence controllers and computers disposed at individual machining stations in a factory, are connected to a main transmission line to effect mutual communications between them. Robots, numerically controlled machine and so forth disposed at the individual machining stations are controlled by way of the communication system.

In the communication system, branch lines of individual communication module appliances are connected to the main transmission line. Accordingly, when a failure such as breaking of a wire, short-circuiting or the like occurs at one of the branch lines to the communication module appliances or at the main transmission line, it is difficult to find out the location of the failure or to determine a manner of the failure. When a failure of breaking of a wire occurs, it is possible to separate the station in failure to allow each of the other stations free from failure to continue its processing by connecting the main transmission line into a loop. However, when a failure of short-circuiting occurs, communications between all of the communication module appliances are disabled. Therefore, in order to find out a location of a failure of short-circuiting, it is necessary to divide the transmission line in many sections and check them in an order. However, this is a very difficult operation.

Accordingly, once the system fails, the entire system must be stopped, and much time is required for discovery of the failure and elimination of the trouble.

Besides, there is a possibility that, when one of the communication module appliances connected to the main transmission line by way of the branch lines is damaged by an overvoltage or an overcurrent, such damage may not be restricted to part of the system but may reach the entire system.

Some of the inventors of the present invention have proposed a multiplex communication system for a sequence controller (U.S. patent application Ser. No. 07/235,498) to solve such a problem. In the present invention, moreover, reduction of time required for elimination of a trouble upon failure of a system is anticipated.

SUMMARY OF THE INVENTION

Accordingly, it is an object of the present invention to attain rapid elimination of a trouble after a communication system fails.

It is another object of the present invention to provide a branching device which facilitates rapid elimination of a trouble particularly against a failure of short-circuiting of a transmission line.

It is a further object of the present invention to provide a transmission line branching device wherein, when a failure of breaking of a wire, short-circuiting or the like occurs at one of branch lines of communication module appliances or at an intermediate main transmission line, elimination of the trouble can be carried out rapidly without requiring much time for discovery of the location of the failure or for determination of a manner of the failure, and the failed station can be separated from the transmission line without having an influence on any other communication module appliance while processing can be continued at any other station free from failure.

A transmission line branching device of the present invention, having three terminals, may be interposed in the half duplex transmission line and transmit an electric signal received from an arbitrary one of three terminals thereof through the other two terminals. Since the terminals are coupled to each other by way of photo-couplers, short circuiting in a transmission system connected to any one of the terminals does not have an influence upon transmission systems connected to the other terminals.

An electrical signal propagated over one of the half duplex transmission lines connected to the three terminals is received by a corresponding receiver by way of a corresponding one of the terminals. The electrical signal thus received is transmitted to drivers corresponding to the other two terminals by way of the photo couplers. Thus, a signal propagated from an arbitrary direction is branched in two directions for further propagation in this manner. In this instance, in order to prevent possible interference between different signals, the transmission directions are controlled in the following manner.

The head of a data block of communication data received by each receiver is detected, and after such detection of the head, a signal which specifies the length of the data block (for example, a signal which presents a high level while the data block is passing) is generated. Then, after communication data are received by way of an arbitrary one of the terminals and a data block is detected, reception of communication data from the other two terminals is inhibited while transmission of the communication data from the other two terminals is enabled.

Since the transmission lines of the three directions of communication data are electrically isolated from each other by means of the photo-couplers, even when a failure of short-circuiting occurs at a main transmission line or at a branch line or the like, the failure can be regarded as an equivalent to breaking of a wire. When the failure occurs at a branch line, the branch line is automatically separated from the main transmission line. On the other hand, when the failure occurs at the main transmission line, restoration of communications can be made by connecting the main transmission line into a loop.

DESCRIPTION OF THE INVENTION

In the following, the embodiment of the present invention will be described with reference to the drawings.

At first, construction of a transmission system including a transmission line branching device of the present invention will be described with reference to FIG. 3.

Figure 1:
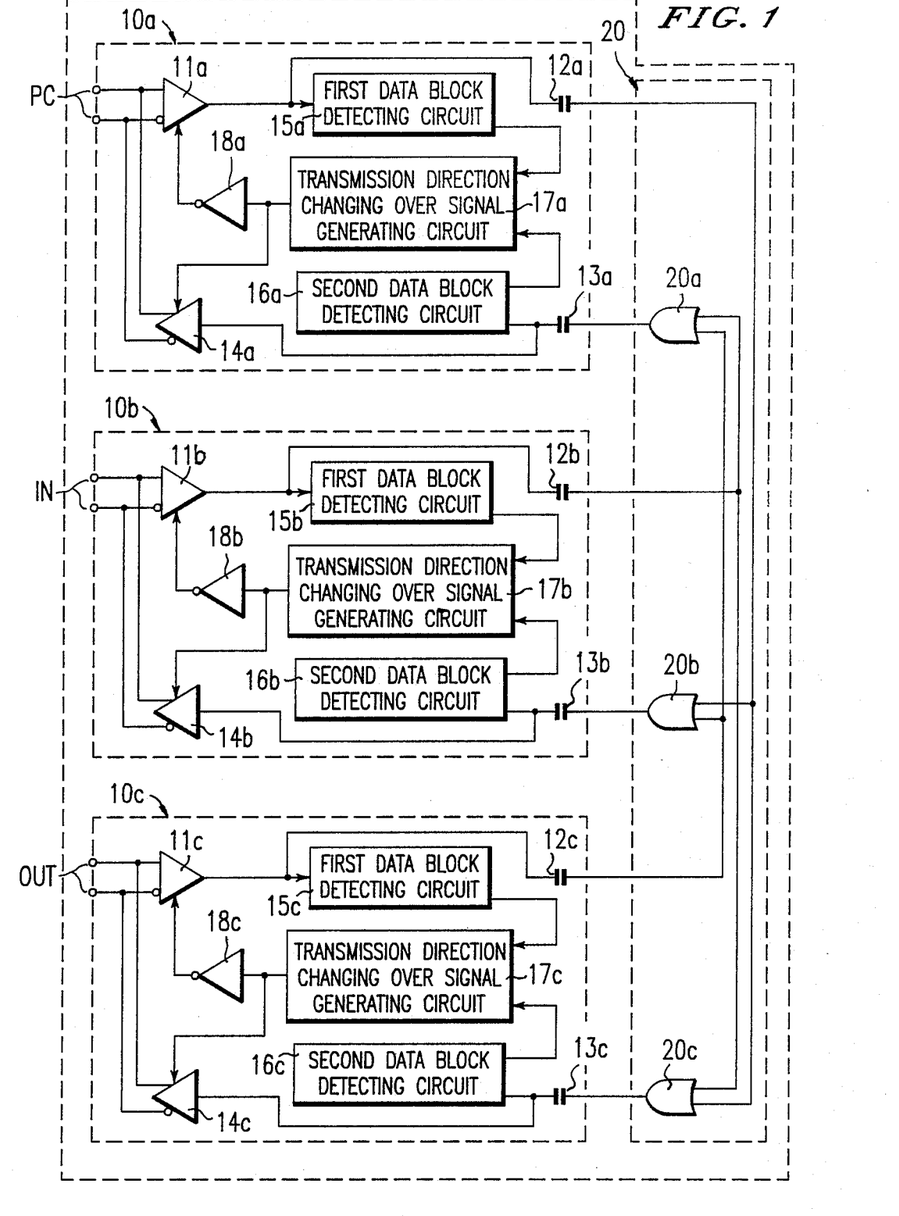
FIG. 1 is a block diagram showing a transmission line branching device according to a preferred embodiment of the present invention.

A transmission line branching device 1 according to the present invention may be disposed at a junction at which a branch line B of each communication module appliance S is connected to a main transmission line M. Referring also to FIG. 1, communication data input/output connecting terminals PC, IN and OUT of transmission devices 10a, 10b and 10c of such transmission line branching devices 1, the branch lines B of the individual communication module appliances S and the main transmission line M are interconnected in such a manner as shown in FIGS. 1 and 3.

Referring to FIG. 1, the transmission line branching device 1 shown includes the three transmission devices 10a, 10b and 10c, each having such communication data input output connecting terminals PC, IN and OUT. The transmission device 10a, 10b and 10c are connected to each other by way of a distributing circuit 20. The distributing circuit 20 is composed of three OR gates 20a, 20b and 20c.

The transmission devices 10a, 10b and 10c have a similar construction to each other, and the transmission device 10a will be described as a representative in the following.

The transmission device 10a includes a receiver 11a which a photo-coupler 12a and a first data block detecting circuit 15a are connected. The first data block detecting circuit 15a detects a start bit in a data block of an output signal of the receiver 11a and generates a maintaining signal to maintain the receiver 11a in a signal passage enabling condition for a predetermined period of time during which at least the data block can be transmitted (time length of the data block).

Figure 4:
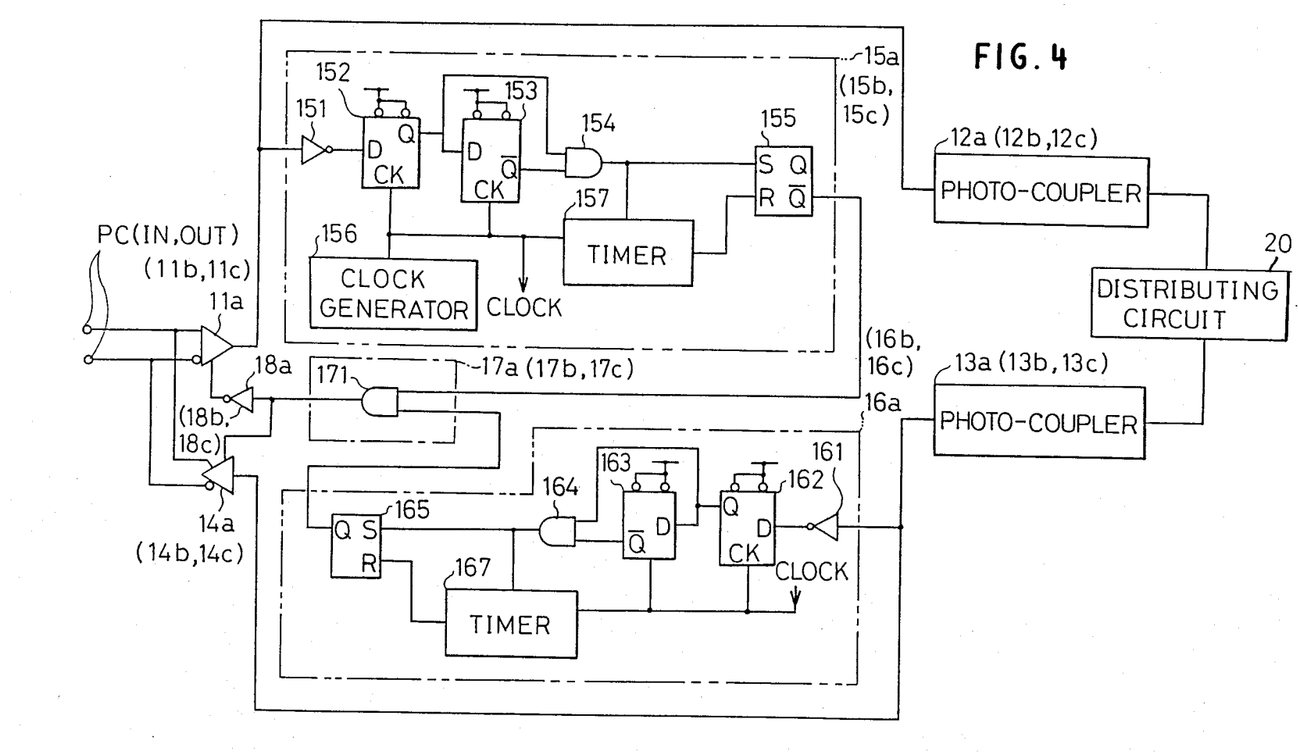
FIG. 4 is a detailed circuit diagram showing a transmission device shown in FIG. 1.

Details of the first data block detecting circuit 15a are shown in FIG. 4. Referring to FIG. 4, an output of an invertor 151 is coupled to a D-type flip-flop circuit 152, and a Q-terminal output of the L-type flip-flop circuit 152 is coupled to a succeeding D-type flip-flop circuit 153. A $\overline{Q}$-terminal output of the D-type fliP-flop circuit 153 and the Q-terminal output of the D-type flip-flop circuit 152 are coupled to an AND gate 154. An output of the AND gate 154 is coupled to an RS-type flip-flop circuit 155 and a timer 157. A timing for latching at the D-type flip-flop circuits 152 and 153 is provided by a clock signal given from a clock generator 156. Meanwhile, the timer 157 starts its counting operation after the output of the AND gate 154 changes from a low level (hereinafter referred to as L level) to a high level (hereinafter referred to as H level), and after a predetermined interval of time elapses, the timer 157 resets the RS-type flip-flop circuit 155. An output of the RS-type flip-flop 155 is coupled to another AND gate 171 which constitutes a transmission direction changing over signal generating circuit 17a.

Meanwhile, an output of the photo-coupler 12a is coupled to the OR gates 20b and 20c as shown in FIG. 1.

On the other hand, communication data from the other two terminals which are transmitted by way of the OR gate 20a from the other transmission devices 10b and 10c are coupled to a driver 14a by way of a photo-coupler 13a and then sent out from the connecting terminal PC by the driver 14a.

Further, a second data block detecting circuit 16a is provided to detect a start bit in a data block of an output signal received from the photo-coupler 13a and generate a maintaining signal to maintain the driver 14a in a signal transmission enabling condition for a predetermined period of time during which at least the data block can be transmitted.

Details of the second data block detecting circuit 16a are also shown in FIG. 4. As seen in FIG. 4, the second data block detecting circuit 16a has a similar construction to that of the first data block detecting circuit 15a but is different in that an invertor 161 is connected to receive an output signal of the photo-coupler 13a.

The transmission direction changing over signal generating circuit 17a is connected to receive signals from the first and second data block detecting circuits 15a and 16a and deliver a control signal in accordance with a predetermined logic to a control terminal of the driver 14a and an invertor 18a. An output of the invertor 18a is coupled to a control terminal of the receiver 11a. In response to a level of such control signal from the transmission direction changing over signal generating circuit 17a, either the receiver 11a is put into a signal passage enabling condition and the driver 14a is put into a signal passage disabling L condition or on the contrary the receiver 11a is put into a signal passage disabling condition and the driver 14a is put into a signal passage enabling condition.

Figure 2:
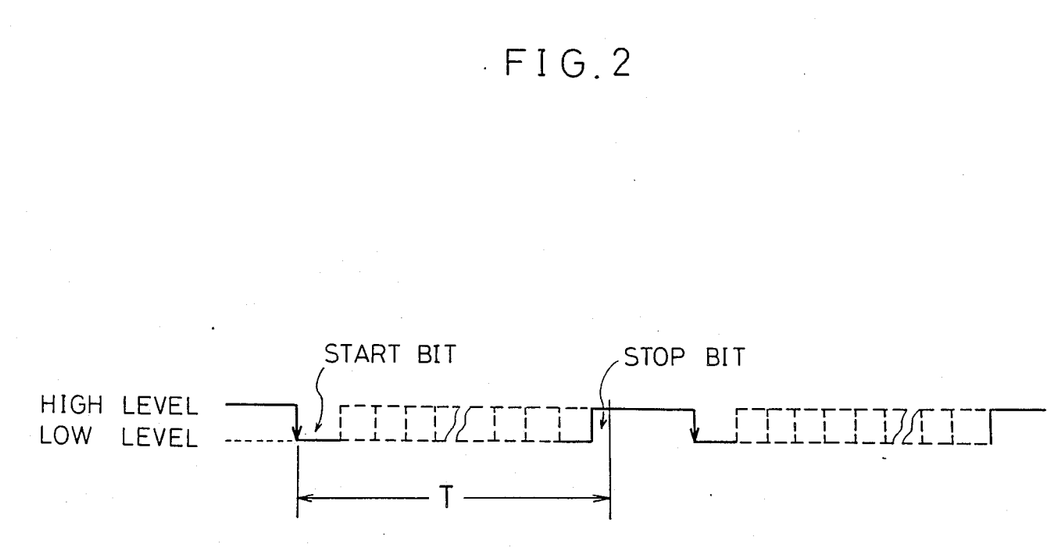
FIG. 2 is a diagram showing a data block of communication data to be transmitted by way of the transmission line branching device of FIG. 1.

The output of the receiver 11a normally presents, in a no-signal condition, the H level as shown in FIG. 2. A data block changes from the H level to the L level and has, after then, a start bit consisting of two bits of the L level. The data block normally terminates with a stop bit of the H level.

The time T from the beginning of the start bit to the stop bit is a transmission duration of a data block (data length in time). The level maintaining periods of time of maintaining signals given from the first data block detecting circuit 15a and the second data block detecting circuit 16a are a little longer than the duration T. The periods of time are set by means of built in timers.

Subsequently, operation of the transmission line branching device will be described.

Since the transmission devices 10a, 10b and 10c operate in a similar manner to each other, description will be given of operation of the transmission device 10a as a representative.

After the power is made available to the transmission line branching device 1, the transmission device 10a stands by in a condition wherein it can accept data from the connecting terminal PC. Initial states of the RS-type flip-flop circuits 155 and 165 are reset states. Accordingly, the Q terminal output of the RS type flip-flop circuit 165 presents the L level, and consequently the output of the AND gate 171 presents the L level. As a result, the driver 14a remains in an inoperative condition. On the other hand, since the output signal of the invertor 18a presents the H level, the receiver 11a is in an operative condition. Accordingly, presence or absence of an electrical signal transmitted by way of the connecting terminal PC can be monitored by the first data block detecting circuit 15a. Meanwhile, presence or absence of an electrical signal received by way of the other two terminals and transmitted to the transmission device 10a by way of the photo coupler 13a is normally monitored by the second data block detecting circuit 16a.

Subsequently, in case an electrical signal is received by way of the connecting terminal PC, such an electrical signal as shown in FIG. 2 is transmitted to the D-type flip-flop circuit 152 by way of the invertor 151 because the receiver 11a remains in an operative condition. The requirement with which the output of the AND gate 154 is changed to the H level is that the Q-terminal output of the D-type flip-flop circuit 152 and the $\overline{Q}$-terminal output of the D-type flip-flop circuit 153 both present the H level. Since the D-type flip-flop circuits 152 and 153 form a 2-position shift register, if the output signal level of the receiver 11a changes from the H level to the L level, then the requirement is satisfied. In particular, when a start bit is detected, the output of the AND gate 154 is changed from the L level to the H level. Consequently, the timer 157 starts its counting operation while the RS-type flip-flop 155 is set. Accordingly, the $\overline{Q}$-terminal output of the RS-type flip flop circuit 155 is changed from the H level to the L level, and consequently the output of the AND gate 171 maintains the L level irrespective of an output level of the second data block detecting circuit 16a.

The timer 157 resets the RS-type flip-flop circuit 155 after the transmission period T of the data block elapses. Consequently, the output signal from the $\overline{Q}$-terminal of the RS-type flip-flop 155 is changed back to the H level of the initial state. The H level of the Q-terminal output of the RS type flip-flop circuit 155 makes an enabling signal for enabling the change of the transmission direction in accordance with the Q-terminal output of the RS-type flip-flop circuit 165. To the contrary, the L level of the $\overline{Q}$-terminal output of the RS-type flip flop circuit 155 makes a maintaining signal for maintaining the initial transmission direction in which the receiver 11a is active. Accordingly, at least during the transmission time T of the data block, the receiver 11a maintains an operative condition while the driver 14a maintains an inoperative condition, and consequently the output signal of the receiver 11a is transmitted to the photo-coupler 12a.

Before the transmission duration T of a data block elapses, there is no communication data to be received via the photo coupler 13a from other two terminals IN, OUT as hereinafter described. However, if communication data should be received via the photo coupler 13a, then the second data block detecting circuit 16a will detect a start bit. Consequently, the maintaining signal to be given from the circuit 16a is changed from the L level to the H level, but since the $\overline{Q}$-terminal output of the RS-type flip flop circuit 155 remains at the L level, the output signal of the transmission direction changing over signal generating circuit 17a maintains the L level. Accordingly, there is no change from the operative condition of the receiver 11a and the inoperative condition of the driver 14a. Due to such control, reception takes precedence over sending to prevent electrical signals from interfering with each other on the half duplex transmission lines.

Subsequently, an electrical signal received by way of the connecting terminal PC is transmitted, by way of the photo-coupler 12a and the OR gates 20b and 20c, to the second data block detecting circuits 16b and 16c of the other transmission devices 10b and 10c, respectively.

Operation of the transmission devices 10b and 10c then will be described as a representative in connection with the transmission device 10b. Referring to FIG. 4 which also shows details of the transmission device 10b, it is assumed that there is no electrical signal received via the connecting terminal IN from the branch line B then. In this instance, the $\overline{Q}$-terminal output of the RS-type flip-flop circuit 155, that is, the output of the first data block detecting circuit 15b, is at the H level. Meanwhile, the Q terminal output of the RS-type flip flop circuit 165, that is, the output of the second data block detecting circuit 16b, normally presents the L level. Then, when a data signal is delivered from the photo coupler 13b, transition of the signal level from the H level to the L level is detected by the D-type flip-flop circuits 162 and 163. Consequently, the output of the AND gate 164 is changed from the L level to the H level to set the RS-type flip-flop circuit 165. As a result, the output of the AND gate 171 is also changed from the L level to the H level because the $\overline{Q}$-terminal output of the RS-type flip flop circuit 155 of the first data block detecting circuit 15b is the H level, by which the receiver 11b is put into an inoperative condition while the driver 14b is put into an operative condition. Such conditions are maintained until the transmission duration T of a data block is counted up by the timer 167 as described hereinabove. Accordingly, during the period of time T, data received from the connecting terminal PC by way of the photo coupler 12a, OR gate 20b and photo-coupler 13b are transmitted from the connecting terminal IN to the branch line B by way of the driver 14b. In the meantime, reception of communication data from the connecting terminal IN is inhibited on the contrary.

After the period of time T elapses, the timer 167 resets the RS-type flip-flop circuit 165 to change the output of the latter from the H level to the L level. Consequently, the output of the AND gate 171 is changed into the L level to restore the transmission direction to the initial in which reception by the receiver 11b is enabled.

Also the transmission device 10c which is connected to the connecting terminal OUT operates in a similar manner to the transmission device 10b. Accordingly, an electrical signal received from the connecting terminal PC is transmitted from the connecting terminals IN and OUT.

Similarly, an electrical signal received by way of the connecting terminal IN is delivered from the connecting terminals PC and OUT. Similarly, an electrical signal received by way of the connecting terminal OUT is delivered by way of the connecting terminals PC and IN.

Figure 5:
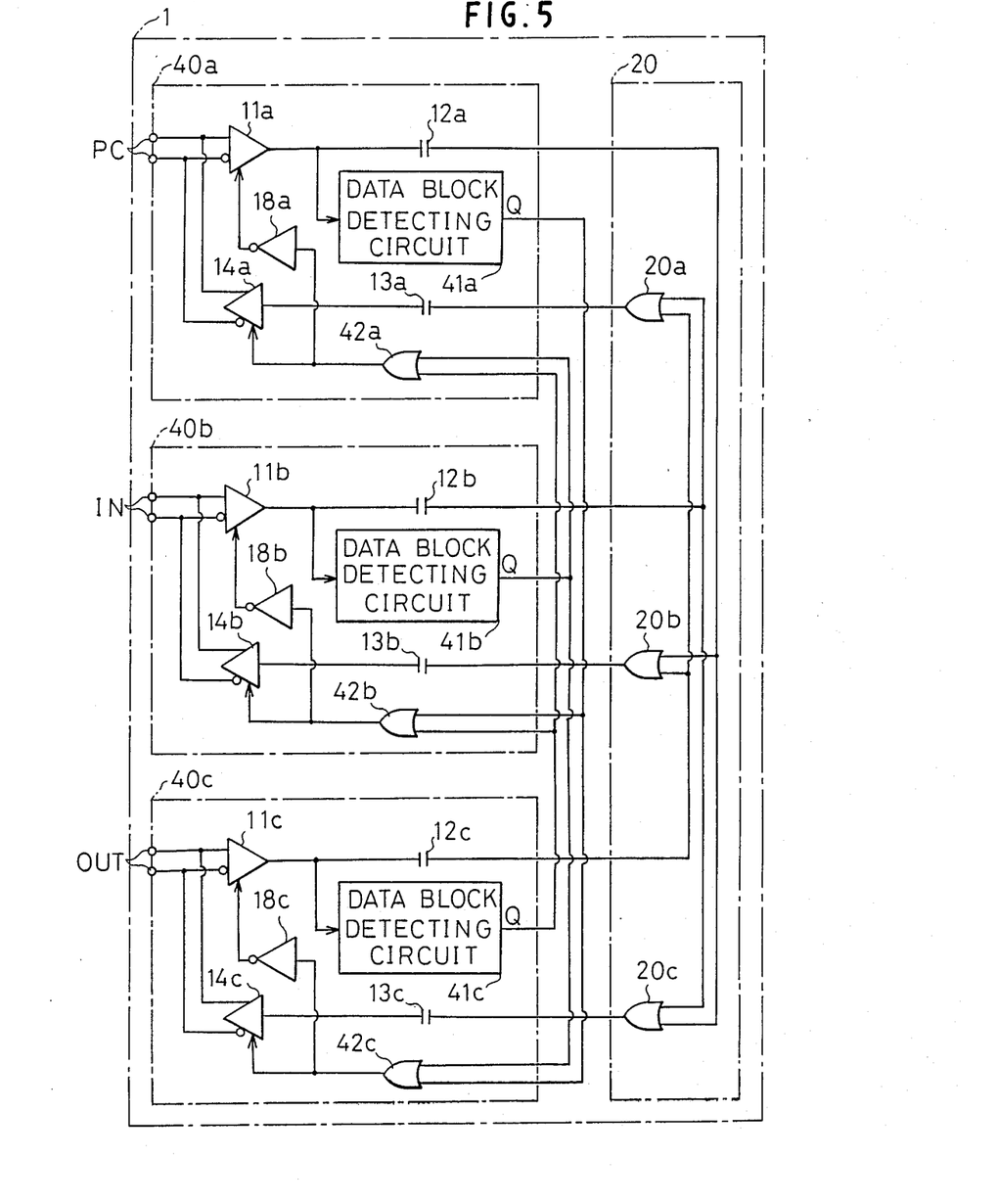
FIG. 5 is a block diagram showing construction of a transmission line branching device according to another preferred embodiment of the present invention.

Subsequently, another embodiment of the present invention will be described with reference to FIG. 5. Here, elements having like functions to those of FIG. 1 are denoted by like reference characters, and description will be given only of differences of the transmission line branching device of the present embodiment from those of the transmission line branching device of the preceding embodiment.

For example, communication data received by way of the connecting terminal PC side of a transmission device 40a of a transmission line branching device 1 are transmitted to a data block detecting circuit 41a by way of a receiver 11a. When the data block detecting circuit 41a, detects a start bit of a data block of the communication data received, the output signal thereof is changed from the L level to the H level. In particular, while the data block detecting circuit 41a has a similar construction to that of the data block detecting circuit 15a of the first embodiment, here the Q-terminal output of the RS-type flip-flop circuit 155 makes an output signal of the data block detecting circuit 41a the H level of which means the duration T for the received data to be transmitted. The output signal of the H level given from the circuit 41a is transmitted by way of OR gates 42b and 42c of the other transmission devices 40b and 40c to put drivers 14b and 14c into an operative condition, respectively. Meanwhile, since the output signals of invertors 18b and 18c are changed from the H level to the L level when the output signal of the data block detecting circuit 41a changes from the L level to the H level, receivers 11b and 11c are put into an inoperative condition thereby. Simultaneously, the communication data transmitted by way of the receiver 11a is transmitted to the drivers 14b and 14c by way of a photo coupler 12, OR gates 20b and 20c of a distributing circuit 20 and photocouplers 13b and 13c. Since the drivers 14b and 14c remain in an operative condition and the receivers 11b and 11c remain in an inoperative condition then, the communication data are sent from the connecting terminals IN and OUT by way of the respective transmission devices 40b and 40c to the branch line B and the main transmission line M. In the meantime, reception of communication data by way of the connecting terminals IN and OUT is inhibited. Then r when the data block detecting circuit 41a of the transmission device 40a detects a stop bit of a data block of the communication data received, the output signal thereof is changed from the H level to the L level. The output signal then is transmitted by way of the OR gates 42b and 42c of the other transmission devices 40b and 40c to put the drivers 14b and 14c into an inoperative condition. Meanwhile, since the output signals of the invertors 18b and 18c are changed to the H level, the receivers 11b and 11c are changed back into an operative condition of the initial state. It is to be noted that such operation described above similarly applies where communication data are received from the connecting terminal IN or OUT of the transmission device 40b or 40c.

Figure 6:
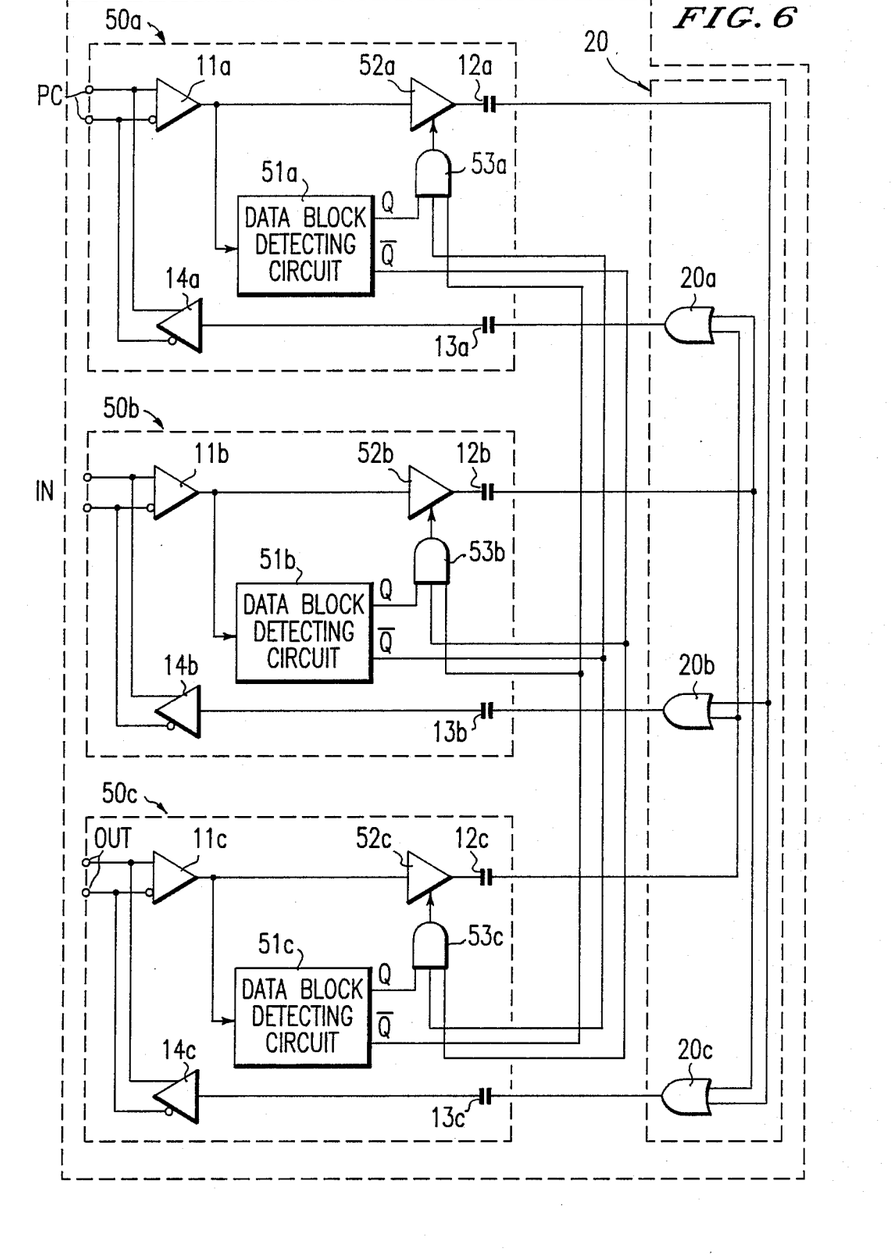
FIG. 6 is a block diagram showing construction of a transmission line branching device according to a further preferred embodiment of the present invention.

Subsequently, a further embodiment of the present invention will be described with reference to FIG. 6. Also, elements having like functions to those of FIG. 1 are denoted by like reference characters, and description will be given only of differences of the transmission line branching device of the present embodiment from those of the transmission line branching device of the preceding first embodiment.

Figure 7:
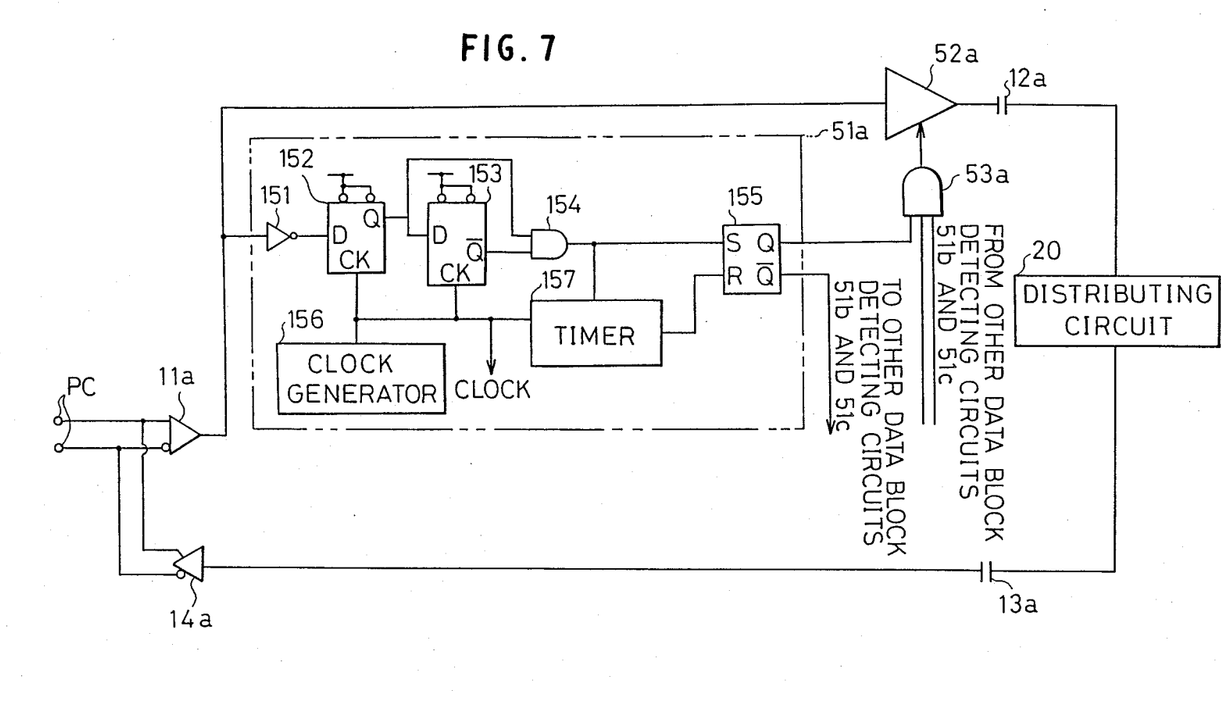
FIG. 7 is a detailed circuit diagram showing a transmission device shown in FIG. 6.

In the initial state, Q-terminal outputs and $\overline{Q}$-terminal outputs of data block detecting circuits 51a, 51b and 51c are the L level and the H level, respectively. Accordingly, outputs of AND gates 53a, 53b and 53c are the L level to cut off analog gates 52a, 52b and 52c. Communication data received from the connecting terminal PC side of a transmission device 50a of a transmission line branching device 1 are transmitted to the data block detecting circuit 51a by way of a receiver 11a. Detailed construction of the data block detecting circuit 51a is shown in FIG. 7. The construction is similar to that of the first data block detecting circuit 15a of the first embodiment described hereinabove. Referring also to FIG. 7, a $\overline{Q}$-terminal output of an RS flip-flop 155 is coupled to an AND gate 53a. The outputs of $\overline{Q}$-terminals of RS flip-flop circuits 155 of the other data block detecting circuits 51b and 51c corresponding to the other connecting terminals of the transmission line branching device are coupled also to the other two input terminals of the AND gate 53a. Meanwhile, a Q-terminal output of the RS-type flip-flop circuit 155 of the data block detecting circuit 51a is coupled to AND gates 53b and 53c of the transmission device 50b and 50c corresponding to the other connecting terminals of the transmission line branching device. The outputs of the AND gates 53a, 53b and 53c are coupled to control terminals of the analog gates 52a, 52b and 52c, respectively.

Subsequently, operation of the transmission line branching device will be described.

When the data block detecting circuit 51a detects reception of communication data by way of the connecting terminal PC, the Q-terminal output of the data block detecting circuit 51a (Q terminal output of the RS-type flip-flop circuit 155) presents the H level for a period of time of passage of the data block. On the contrary the $\overline{Q}$-terminal output of the data block detecting circuit 51a ($\overline{Q}$-terminal output of the RS-type flip-flop circuit 155) presents the L level for the period of time of passage of the data block. Consequently, the output of that one of the AND gates 53a, 53b and 53c which corresponds to one of the three connecting terminals PC, IN and OUT of the transmission line branching device at which the communication data are received in the first place presents the H level while the output signals of the AND gates 53 corresponding to the other two connecting terminals present the L level for the period of time of passage of the communication data. Accordingly, only one of the analog gates 52a 52b and 52c which corresponds to the connecting terminal at which communication data are received in the first place is put into a signal passage enabling condition. The following description will proceed on the assumption that the analog gate which is put into a signal passage enabling condition in the first place is the analog gate 52a corresponding to the connecting terminal PC.

Thus, a signal received by way of the connecting terminal PC is transmitted by way of the receiver 11a, analog gate 52a, photo-coupler 12a, OR gates 20b and 20c and photo-couplers 13b and 13c to the drivers 14b and 14c and sent out by way of the connecting terminals IN and OUT to the branch line B and the main transmission line M, respectively.

Meanwhile, since the $\overline{Q}$-terminal output of the data block detecting circuit 51a presents the L level while the data block continues to be received, the outputs of the AND gates 53b and 53c present the L level. Consequently, the analog gates 52b and 52c maintain a signal passage disabling condition. Accordingly, the outputs of the receiver 11b and the receiver 11c are not propagated to the other connecting terminals.

Then, when the reception of the data block of the communication data has been completed, the Q-terminal output signal thereof is changed from the H level to the L level. Then, since the output signal is transmitted to the AND gate 53a, the output signal of the AND gate 53a is changed to the L level. Consequently, the analog gate 52a is put into a signal passage disabling condition and is thus disconnected from the other connecting terminals.

Meanwhile, the $\overline{Q}$-terminal output of the data block detecting circuit 51a is changed to the H level to be entered into the AND gates 53b and 53c. Accordingly, the outputs of the AND gates 53b and 53c are controlled by the levels of the Q terminal outputs of the data block detecting circuits 51b and 51c, respectively. Therefore, if the data block detecting circuit 51b or 51c detects a data block, then the analog gate 52b or 52c will be put into a signal passage enabling condition at any time.

It is to be noted that such operation as described above similarly applied where communication data are received at the connecting terminal IN or OUT side of the transmission device 50b or 50c.

As apparent from the foregoing description of the embodiments, since the transmission line branching devices 1 are electrically isolated from one another, even if a failure of short circuiting occurs at a communication module appliance S or a branch line B, processing can be continued at any other station free from failure.

Figure 3:
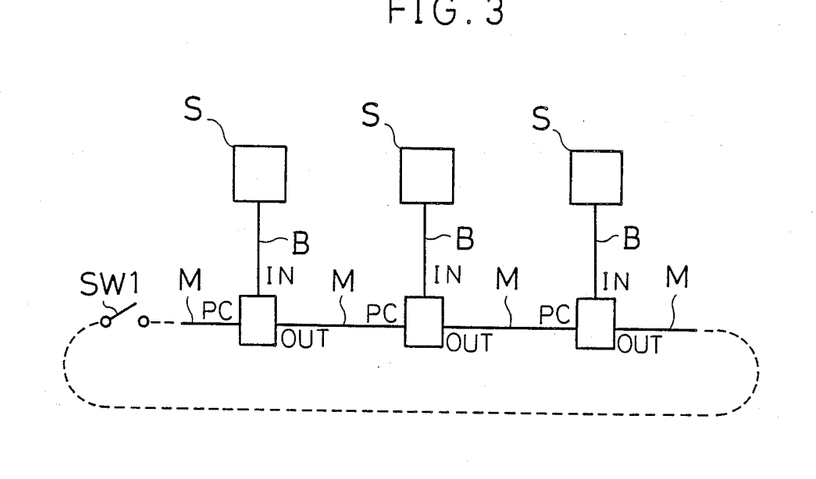
FIG. 3 is a block diagram showing an entire communication transmission system including the transmission line branching device of FIG. 1.

Further, in case a failure of breaking of a wire or short-circuiting takes place at the main transmission line M, a loop line should be provided such that, for example, it may connect the left and right opposite directions of the main communication line M as indicated by a broken line in FIG. 3. Then, a normally-open switch SW1 may be provided in the loop line. Thus, if the switch SW1 is operated, then processing can be continued at any station. And it is possible to repair the failure of breaking of a wire or short-circuiting or the like of the main transmission line M with keeping the normal communications.

Figure 8:
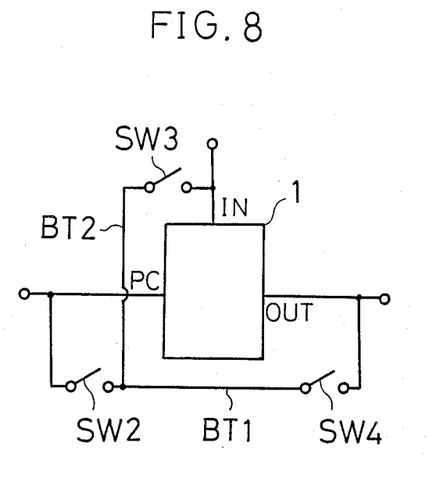
FIG. 8 is a block diagram showing construction of a transmission line branching device according to a still further preferred embodiment of the present invention.

Here, if data transmission becomes impossible at any transmission line branching device 1 due to a failure of or interruption of the power supply to the transmission line branching device 1, communications will be come impossible through the main transmission line M or a branch line B of a communication module appliance S and the equipment will be stopped. Even if there is no such failure at the main transmission line M or at any branch line B, there is a possibility that a communication disabling condition may be caused by a trouble at a transmission line branching device 1 itself. As a countermeasure, as shown FIG. 8, bypass transmission lines BT1 and BT2, which bypass among the PC terminal, the OUT and the IN, may be provided for each transmission line branching device 1, and mechanical switches SW2, SW3 and SW4 may be individually disposed in such bypass transmission lines BT1 and BT2. With the construction, if a transmission line branching device 1 is put into a communication disabling condition, then the transmission lines can be assured temporarily and the relief can be made by suitably operating the corresponding mechanical bypassing switch SW2, SW3 or SW4. Thus, the time required for an interval of time until restoration after a communication disabling condition can be reduced.

What is claimed is:

1. A transmission line branching device adapted to be interposed among three half duplex transmission lines for sending out an electrical signal, which is received at an arbitrary one of three terminals thereof individually connected with said half duplex transmission lines, through the other two terminals to the corresponding two transmission lines connected therewith, comprising:
   three receivers individually provided for said terminals and each adapted to receive, by way of a corresponding one of said terminals, an electrical signal propagated over a corresponding one of said half duplex transmission lines;
   three drivers individually provided for said terminals and each adapted to sent out, by way of a corresponding one of said terminals, an electrical signal to a corresponding one of said half duplex transmission lines;
   first photo-couplers individually connected with said receivers and each adapted to convert an electrical signal received from a corresponding one of said receivers into an optical signal and convert the optical signal again into an electrical signal;
   second photo-couplers individually connected with inputs of said drivers and each adapted to deliver an electrical signal to a corresponding one of said drivers;
   a distributing circuit for connecting an output of one of said first photo-couplers corresponding to an arbitrary one of said terminals with those of said second photo-couplers corresponding to the other two terminals;
   three data block detecting means individually provided for said receivers and each adapted to detect the head of a data block of communication data received by way of a corresponding one of said receivers and generate, after such detection of the head, a signal which specifies the length of the data block; and
   a data reception/sending changing over means responsive to an output signal of an arbitrary one of said data block detecting means when a data block of communication data is detected by the arbitrary data block detecting means, for inhibiting reception of communication data by way of the other two terminals and enabling sending of the communication data from the other two terminals.

2. A transmission line branching device according to claim 1; wherein said data reception/sending changing over means includes
   three second data block detecting means individually connected with outputs of said second photo-couplers and each adapted to detect the head of a data block of communication data received through a corresponding one of said second photo-couplers and generate, after the head is detected, a signal which specifies the length of the data block, and
   transmission direction changing over signal generating circuits individually provided for said terminals and each adapted to give, in response to output signals given from the corresponding one of said data block detecting means and the corresponding one of said second data block detecting means, to the corresponding one of said drivers and the corresponding one of said receivers, a change-over controlling signal to control passage or blockage of signals by the driver and the receiver to change over the transmission direction.

3. A transmission line branching device according to claim 1, wherein said data reception/sending changing over means gives, in response to a signal, given from one of said data block detecting means corresponding to an arbitrary one of said terminals, representing that a data block has been detected, to those of said drivers and said receivers corresponding to the other two terminals, a control signal to put the drivers into a signal passage enabling condition and put the receivers into a signal passage disabling condition.

4. A transmission line branching device according to claim 1, wherein said data reception/sending changing over means includes analog gates individually interposed between said receivers and corresponding ones of said first photo-couplers, and a logic circuit for receiving an output signal of one of said data block detecting means corresponding to an arbitrary one of said terminals and output signals of those of said data block detecting means corresponding to the other two terminals and for controlling, in response to the output signals thus received, passage or blockage of a signal by one of said analog gates corresponding to the arbitrary terminal 5. A transmission line branching device according to claim 2, wherein, in an initial state of said transmission line branching device, said receivers are all in a signal passage enabling condition while said drivers are all in a signal passage disabling condition.

6. A transmission line branching device according to claim 2, wherein one of said transmission direction changing over signal generating circuits corresponding to an arbitrary one of said terminals generates, for a period of time during which the output signal of one of said data block detecting circuits corresponding to the arbitrary terminal represents that a data block is being transmitted, a signal to prevent one of said drivers corresponding to the arbitrary terminal from changing into a signal passage enabling condition irrespective of an output signal of one of said second data block detecting circuits corresponding to the arbitrary terminal.

7. A transmission line branching device according to claim 2, wherein one of said data block detecting circuit corresponding to an arbitrary one of said terminals generetes, an enabling signal to enable that one of said drivers corresponding to the arbitrary terminal changes into a signal passage enabling condition in response to an output signal of one of said second data block detecting circuits corresponding to the arbitrary terminal, while the head of a data block is not being detected.

8. A transmission line branching device according to claim 7, wherein one of said transmission direction changing over signal generating circuits corresponding to an arbitrary one of said terminals generates, in case a signal indicating that it is a period for transmission of a data block is given from one of said second data block detecting circuits corresponding to the arbitrary terminal while an enabling signal continues to be given from one of said data block detecting circuits corresponding to the arbitrary terminal, a change-over controlling signal to put one of said receivers corresponding to the arbitrary terminal into a signal passage disabling condition and put one of said drivers corresponding to the arbitrary terminal into a signal passage enabling condition only for a period of time during which the signal is being given.

* * * * *